United States Patent [19]
Brown et al.

[11] 3,870,951
[45] Mar. 11, 1975

[54] MOISTURE MEASURING PROBE

[75] Inventors: Earle C. Brown, Oakville, Ontario; Errol J. Byers; Ghulam A. Kayani, both of Mississauga, Ontario, all of Canada

[73] Assignee: Ontario Research Foundation, Sheridan Park, Ontario, Canada

[22] Filed: Mar. 6, 1974

[21] Appl. No.: 448,562

[52] U.S. Cl............................... 324/61 P, 317/246
[51] Int. Cl............................................. G01r 27/26
[58] Field of Search .......... 324/61 R, 61 P; 317/246

[56] References Cited
UNITED STATES PATENTS
2,304,448  12/1942  Fletcher............................ 324/61 R
2,848,710  8/1958  Owen............................ 324/61 R X

*Primary Examiner*—Stanley T. Krawczewicz
*Attorney, Agent, or Firm*—Sim & McBurney

[57] ABSTRACT

A moisture measuring probe of generally elongate cylindrical form is provided for use in field operations in which the probe is to be located remote from the measuring or recording instruments. The probe consists of two cylindrical conductors mounted on a hollow dielectric material cylinder sealed at both ends and in which is located the electronic detecting circuit components, thereby insulating them from the influence of stray signals. The end-to-end alignment of the conductors provides an external field which permits measurement of the moisture content of the material surrounding the probe. The transmission cable for the applied voltage to the probe is terminated in an electrical network whose resistance is equal in value to the characteristic impedance of the cable, and the detecting circuit produces a direct current in the return cable which is related to the moisture content of the material in which the probe is located.

7 Claims, 4 Drawing Figures

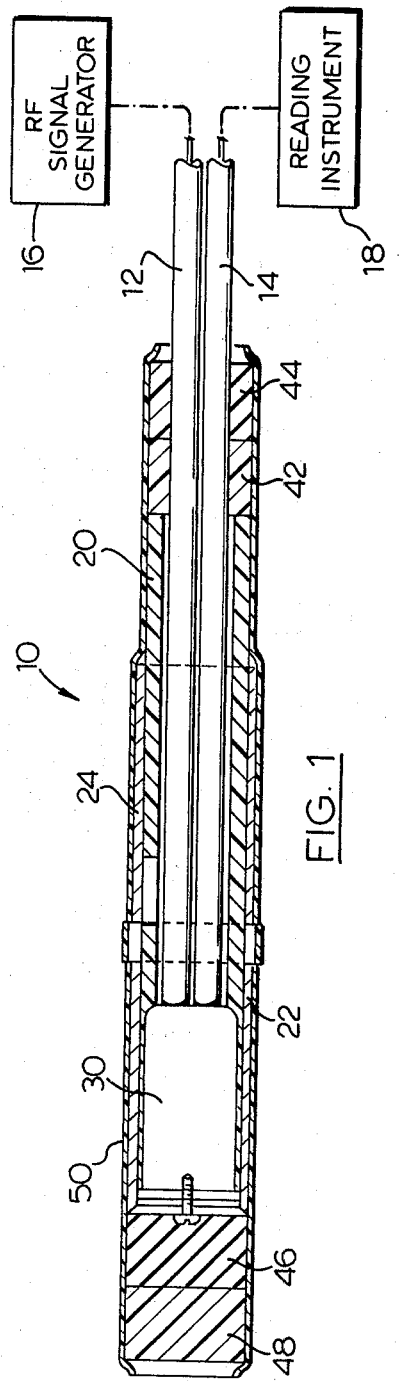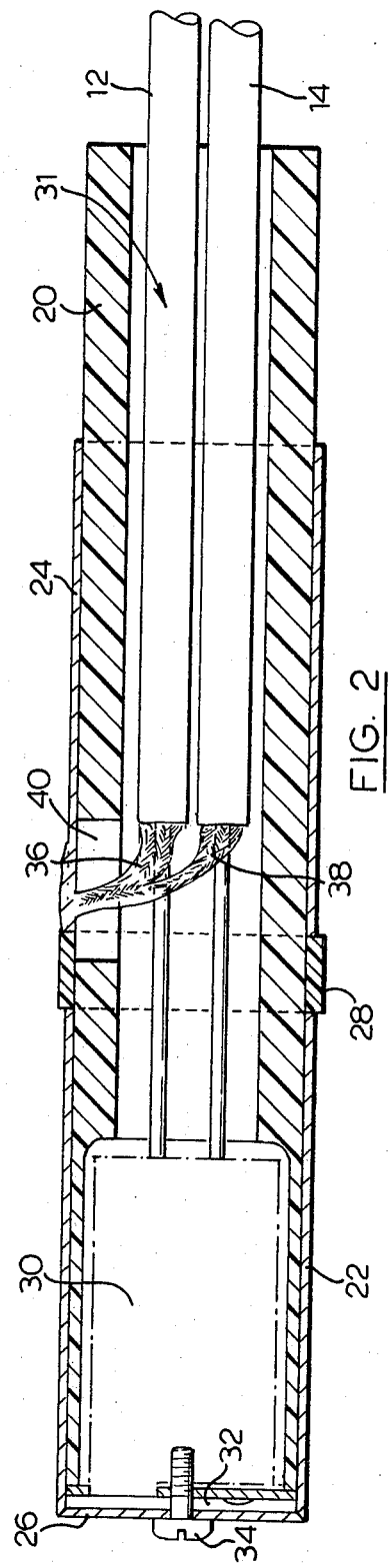

MOISTURE MEASURING PROBE

FIELD OF THE INVENTION

The present invention relates to a moisture measuring probe.

BACKGROUND TO THE INVENTION

The measuring of the moisture content of materials by observing the strength of an alternating current high frequency field generated between capacitor plates and through the material is well known.

The measuring and continuous monitoring of the moisture content of bulk materials in field applications, however presents difficulties, due to the lack of portability of many commercially-available devices, which mainly are constructed for factory in-line monitoring of moisture values.

A typical example of such a field application is the determination of the moisture content of wet or cured concrete for building purposes, such as, in the construction of roads. In such field applications, the probe must be readily portable, must be rugged to withstand vibration and mechanical shocks, since it may require to be left in place for some time, and must be of a shape which allows ready penetration of bulk materials.

Further, a probe for use in such applications, due to the nature of the materials whose moisture content is to be measured, requires the locating of the moisture value measuring and/or recording instrument at a position distant from the probe itself. This arrangement gives rise to difficulties in the obtaining of accurate reading due to variation in impedance values of the cables and the susceptibility of the detecting circuity to stray electric fields.

SUMMARY OF INVENTION

The present invention provides a moisture measuring probe which is readily portable and is rugged, and additionally is capable of providing accurate readings of detected moisture content of bulk materials at a remote location.

In accordance with the invention, the moisture probe includes an elongate hollow cylinder of dielectric material on the external surface of which is mounted a pair of electrical conductors which are spaced apart and insulated from each other. An outer protective coating with suitable mechanical and electrical characteristics is applied to the electrodes.

The high frequency detector circuitry is positioned within the hollow cylinder which is sealed at both ends against the entry of moisture. The location of the detector circuitry within the probe in this manner shields it from stray fields which otherwise may affect the reading.

The coaxial alignment of the electrodes provides a structure which is capable of producing an external field which permits measurement of the moisture content of the material surrounding the probe. This configuration results in an elongated cylindrical probe which is readily inserted into bulk material.

The detector circuitry positioned within the probe is attached to the electrical conductors and additionally to a pair of cables, one of which provides an alternating current high frequency, usually radio frequency, signal to the circuitry from a remote location and thence to one of the plates. The circuitry is such that the alternating voltage between the conductors is detected and is returned as a direct current signal, to a remote measuring and/or recording device by the other cable.

In order to avoid the effects of the impedance in the high frequency signal feed cable which may distort or otherwise provide an inaccurate reading, the transmission cable is terminated in an electrical network whose resistance is equal in value to the characteristic impedence of the cable, thereby eliminating such cable impedence. Since the return cable carries a direct current signal, the possibility of cable impedences distorting the detected value are eliminated.

BRIEF DESCRIPTION OF DRAWINGS

FIG. 1 is a part sectional view of a probe according to the present invention;

FIG. 2 is a detailpart sectional view of the probe of FIG. 1 with parts removed;

DESCRIPTION OF PREFERRED EMBODIMENTS

Figure 3:
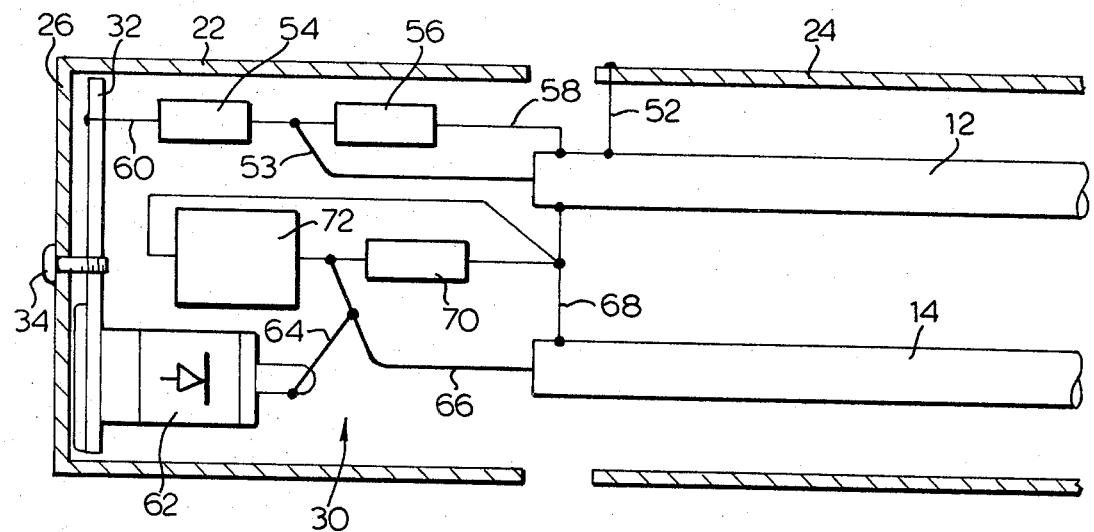
FIG. 3 is a detailed view of the layout of the electronic components in the probe of FIG. 1.

Referring first to FIGS. 1 and 2, a probe 10 is of cylindrical shape, and hence is readily suitable for insertion into bulk materials whose moisture content is to be measured, and has a pair of coaxial cables 12 and 14 leading thereto. Coaxial cable 12 is attached to an alternating current high frequency generator 16 to provide an alternating current high frequency signal to the probe 10. The coaxial cable 14 is attached to a reading instrument 18, of any convenient type, for measuring or recording the measured moisture content of the material surrounding the probe.

The generator 16 and recording instrument 18 usually are positioned at a remote location from the probe 10, allowing the probe 10 to be utilized in versatile manner.

The probe 10 includes a hollow elongate cylindrical member 20 constructed of dielectric material. A pair of cylindrical electrical conductors 22 and 24 is mounted on and is supported by the outer face of the cylindrical member 20. The conductor 22 is in the form of a cylinder having an end closure 26 which serves to close one end of the hollow member 20.

The electrical conductors 22 and 24 are longitudinally spaced apart from each other by a dielectric spacing ring 28 which ensures that the conductors 22 and 24 are electrically insulated from each other within the probe. The end-to-end alignment of the conductors 22 and 24 results in an external field for the measurement of the moisture content of the material surrounding the probe.

High frequency detector circuit elements 30 are positioned within the hollow passage portion 31 of the cylindrical member 20. The positioning and nature of the circuit elements 30 is discussed in more detail below with reference to FIGS. 3 and 4.

The circuit elements 30 include a conductive mounting plate 32 which is connected to the end closure 26 by a conductive bolt 34, the mounting plate 32 thereby being supported by the end closure 26. The connection of the end closure 26 to the conductive mounting plate 32 through the bolt 34 establishes electrical connection between the circuit elements 30 and the conductor 22.

Since the circuit elements 30 are surrounded by the cylindrical conductor 22 their performance is substantially unaffected by stray electric fields.

Electrical connection to the conductor 24 is achieved by suitable grounding. The cables 12 and 14 are generally of coaxial type and the outer conductive ground sheaths 36 and 38 are connected to the conductor 24 in a suitable manner through an opening 40 in the side wall of the cylindrical member 20.

The cables 12 and 14 extend into the probe 10 through annular sealing members 42 and 44, constructed of any suitable material. Similar sealing plugs 46 and 48 are provided at the other end of the cylindrical member 20.

The seals 42 and 46 generally are constructed of a flexible material, such as silicone rubber, while the seals 44 and 48 generally are constructed of a durable rigid material, such as cured epoxy resin, although other materials may be used. The seals 42 to 48, arranged in this manner, ensure that the internal portions of the probe 10 in the passage 31 are kept moisture free at all times.

The probe 10 is encapsulated in a thin coating 50 of material having suitable strength and durability for use in the field and has a high dielectric constant, typically shrinkable "TEFLON" (Trademark). Other materials may be used for the coating 50, for example, heat shrinkable polyolefin tubing and heat shrinkable "NEOPRENE" (Trademark). It is preferred, in accordance with this invention, to protect the outer surfaces of the conductors 22 and 24 in this way in order to avoid inaccurate measurements due to variations in surface properties of bare conductors 22 and 24 with time in use, and problems associated with utilizing the probe in a wet environment.

Figure 4:
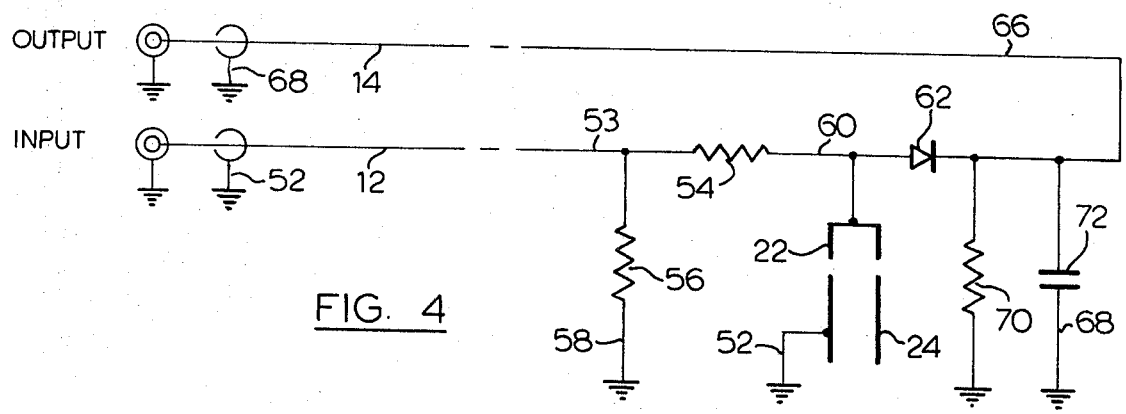
FIG. 4 is a circuit diagram of the electronic components of FIG. 3.

Turning now to consideration of FIGS. 3 and 4, wherein is illustrated details of a typical electronic circuitry which may be used in accordance with this invention, circuit elements 30 are supported on the electrically conductive mounting plate 32. Coaxial cable 12 has its sheath grounded to conductor 24 by wire 52. The transmission lead 53 of the cable 12 terminates at the junction between resistors 54 and 56, resistor 56 also being connected by wire 58 to the sheath of the cable 12.

The resistor 56 has a value which is equal to the characteristic impedence of the cable 12, thereby eliminating the effects of cable impedences on the signal.

The resistor 54 is connected by wire 60 to the mounting board 32, thereby establishing a circuit between the transmission line 53 and the conductor 22. A diode 62 and long time constant network made up of resistor 70 and capacitor 72 is provided to establish a direct current signal to the recording instrument.

The diode 62 is mounted in electrically conductive relation with the mounting board 32. The output side of the diode 62 is connected by wire 64 to the central wire 66 of the coaxial cable 14. The ground sheath of the coaxial cable 14 is connected to the conductor 24 by line 68, also establishing a connection between the wire 66 and the ground by connection between the junction of wires 64 and 66 and line 68 through the third resistor 70 and the capacitor 72.

The electronic circuitry described above with reference to FIGS. 3 and 4 represents only a typical arrangement. Any other convenient circuitry to detect the measured field may be used.

In a typical arrangement, the values utilized for the components of the circuitry of FIGS. 3 and 4 are those set forth in the following Table.

TABLE

| Component | Value | Type |
|---|---|---|
| $R_1$ | 51 ohms± 1%, ½ watt | 1 RC type MEB precision film resistor |
| $R_2$ | 750 ohms± 1%, | do. |
| $R_3$ | 931 Kilo-ohms, ½ watt | do. |
| D | 1N21B | Microwave silicon detector diode |
| C | 0.0015µF, 500 v. | Mallory type 5 × 215 408 |

The probe 10 may be inserted into an opening formed in, or otherwise positioned in, the material of which it is desired to measure the moisture content. A radio, or other high frequency, input voltage is applied to the probe 10 by cable 12, including a current in the resistor 56, thereby producing a voltage across resistor 56 which is similar to the applied voltage.

This voltage induces a current in the series combination of resistor 54 and the conductor 24 which forms one plate of an electrical capacitance (indicated as Cp in FIG. 4). A voltage is produced between the conductors 22 and 24 (i.e., across the capacitance Cp) which is inversely proportional to the value of the capacitance Cp. The value of the capacitance Cp varies with the ability of the conductors 22 and 24 to conduct applied voltage therebetween through the material surrounding the probe 10. This ability is directly related to the quantity of moisture present in the material surrounding the probe 10 and hence the voltage developed across the conductors 22 and 24 varies inversely with the level of moisture in the material surrounding the probe.

The high frequency voltage developed across the conductors 22 and 24 is detected by the diode 62 and is filtered by the time constant network of resistor 30 and capacitance 72 to produce a direct current which is inversely proportional to the value of the capacitance of the conductors 22 and 24 and hence a measure of the moisture level. The direct current is returned to the measuring instrument by cable 14.

SUMMARY

The present invention, therefore, provides a moisture measuring probe which may be used for in-field measurements on a variety of materials, such measurements being made on a continuous monitoring basis, or on intermittent occasions. The probe of the invention may be left in place for long periods of time, while still being portable for transportation to different locations. The nature of the probe is such that the readings of the moisture level of the material in which the probe is positioned may be accurately made at a location remote from the probe, while the effect of stray electric fields on such readings is substantially eliminated.

The probe may be used to measure or monitor the moisture content of a large range of materials, including wet concrete prior to pouring roadway pavements, cured concrete in roadway pavements, grain during storage or shipment, soil and other bulk or powder materials.

What we claim is:

1. A moisture measuring probe comprising:

an elongate hollow cylindrical element having an exterior surface and an axial bore and constructed of dielectric material, a pair of cylindrical electrically-conductive elements mounted in longitudinally spaced-apart relation on the exterior surface of said hollow cylindrical element and supported thereby, said pair of cylindrical conductive elements being capable fo establishing a voltage therebetween only through materials of the environment in which the probe is located, high frequency detector circuit means positioned within the axial bore of said elongate hollow cylindrical element, electrical connection means separately connecting elements of said detector circuit means to said pair of cylindrical elements for detecting voltage generated between said cylindrical elements when said probe is located in a moisture-containing environment and providing a direct current signal corresponding to said detected voltage, first electrical cable means connected to said detector circuit means and extending remote from said probe to convey alternating current high frequency signals to said detector circuit means whereby said generated voltage may be provided, second electrical cable means connected to said detector circuit means and extending remote from said probe to convey said direct current signal from said probe, sealing means isolating said axial bore from fluid flow communication with the exterior environment of the probe, and an outer covering of dielectric material overlying and encapsulating said pair of electrically-conductive elements and said elongate cylindrical element.

2. The probe of claim 1 wherein said pair of electrically-conductive elements is spaced apart by a band of dielectric material mounted on the exterior surface of said hollow cylindrical element and supported thereby and located between said pair of electrically-conductive elements in edge-touching engagement therewith.

3. The probe of claim 1 wherein one of said pair of electrically-conductive elements is in the form of a cylinder having an end closure, said end closure closing off one end of the axial bore, said detector circuit means includes an electrically-conductive mounting plate positioned in the axial bore, and said electrical connection means connecting said detector circuit means to said one of said pair of electrically-conductive elements is constituted by electrically-conductive joining means extending between said end closure and said mounting plate.

4. The probe of claim 3 wherein said electrically-conductive joining means is an electrically-conductive stud extending through said end closure and terminating in said mounting plate for holding said mounting plate in substantially fixed position in the axial bore.

5. The probe of claim 1 wherein said detector circuit means includes an electrical network whose resistance is equal in value to the characteristic impedance of said first cable means, said first cable means terminating in said electrical network.

6. The probe of claim 1 wherein said first cable means includes a ground lead connected to one of said pair of electrically-conductive elements and a second lead connected to one side of a first resistor forming one element of said detector circuit means and having a value which is substantially equal to the characteristic impedance of said first cable means, said first resistor also being connected at its other side to said one of said pair of electrically-conductive elements, said detector circuit means also includes a second resistor connected between said one side of said first resistor and the other of said electrically-conductive elements, thereby providing said electrical connection means, a diode connected on one side to one lead of said second cable means and on the other side to said other of said pair of electrically-conductive elements, and a third resistor and a first capacitance both connected between said one side of said diode and said one of said pair of electrically-conductive elements, and said second cable means includes a ground lead connected to said one of said pair of electrically-conductive elements.

7. The probe of claim 1 wherein said sealing means comprises plugs contacting both ends of said elongate cylindrical element and having a diameter substantially that of said elongate cylindrical element, said plugs being encapsulated in said outer covering.

* * * * *